US011330299B2

(12) United States Patent
Huo et al.

(10) Patent No.: US 11,330,299 B2
(45) Date of Patent: May 10, 2022

(54) INTRA PREDICTION METHOD AND DEVICE AND COMPUTER-READABLE STORAGE MEDIUM

(71) Applicant: GUANGDONG OPPO MOBILE TELECOMMUNICATIONS CORP., LTD., Guangdong (CN)

(72) Inventors: Junyan Huo, Guangdong (CN); Yanzhuo Ma, Guangdong (CN); Shuai Wan, Guangdong (CN); Fuzheng Yang, Guangdong (CN); Jinkun Guo, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 17/355,032

(22) Filed: Jun. 22, 2021

(65) Prior Publication Data
US 2021/0321132 A1 Oct. 14, 2021

Related U.S. Application Data

(63) Continuation of application No. PCT/CN2019/070153, filed on Jan. 2, 2019.

(51) Int. Cl.
*H04N 19/11* (2014.01)
*H04N 19/176* (2014.01)
*H04N 19/593* (2014.01)
*H04N 19/136* (2014.01)

(52) U.S. Cl.
CPC ........... *H04N 19/593* (2014.11); *H04N 19/11* (2014.11); *H04N 19/136* (2014.11); *H04N 19/176* (2014.11)

(58) Field of Classification Search
CPC .......................... H04N 19/593; H04N 19/136
See application file for complete search history.

(56) References Cited

U.S. PATENT DOCUMENTS 11,140,387 B2 * 10/2021 Lee ...................... H04N 19/117
2020/0099925 A1 * 3/2020 Lee ...................... H04N 19/176
(Continued)

FOREIGN PATENT DOCUMENTS

| CN | 108235008 A | 6/2018 |
| CN | 108605122 A | 9/2018 |

(Continued)

OTHER PUBLICATIONS

International Search Report dated Sep. 26, 2019 of PCT/CN2019/070153 (4 pages).

(Continued)

*Primary Examiner* — Tsion B Owens
(74) *Attorney, Agent, or Firm* — Perkins Coie LLP

(57) ABSTRACT

An intra prediction method and device and a computer-readable storage medium, the method comprising: configuring actual angle modes indicated by relative angle numbers, wherein the relative angle numbers are successively represented within a prediction direction range corresponding to a preset width and height relationship; starting from a starting angle, using a corresponding actual angle mode after sampling preset angle sample points, said starting angle being determined according to the width and height relationship of processing blocks and the prediction direction range corresponding to the preset width and height relationship, and actual angles having a one-to-one correspondence with the actual angle modes.

24 Claims, 7 Drawing Sheets

(56) References Cited

U.S. PATENT DOCUMENTS

| 2020/0099935 A1* | 3/2020 | Lee | H04N 19/124 |
| 2020/0195950 A1* | 6/2020 | Zhao | H04N 19/103 |
| 2021/0006799 A1* | 1/2021 | Lee | H04N 19/105 |
| 2021/0144402 A1* | 5/2021 | Lee | H04N 19/105 |

FOREIGN PATENT DOCUMENTS

| CN | 109040754 A | 12/2018 |
| EP | 3349448 A1 | 7/2018 |
| WO | 2018127624 A1 | 7/2018 |

OTHER PUBLICATIONS

Bross, B et al. "Versatile Video Coding (Draft 2)" JVET-K1001-v7; JVET of ITU-T SG 16 WP3 and ISO/IEC JTC 1/SC 29 WG 11; Ljubljana, SI; Jul. 10-18, 2018. 139 pages.

Extended European Search Report for European Application No. 19906725.7 dated Nov. 25, 2021. 11 pages.

Lainema, J et al. "4.4 Intra Mode Coding" in High Efficiency Video Coding (HEVC); Sep. 3, 2014; Springer International Publishing; pp. 103-106.

Rath, G. et al. "CE3-related: Block Shape Adaptive Intra Prediction Directions" JVET-K0169 JVET of ITU-T SG 16 WP3 and ISO/IEC JTC 1 /SC 29 WG 11; Ljubljana, SI; Jul. 10-18, 2018. 6 pages.

Zhao, L. et al. "CE3-related: Unification of angular intra prediction for square and non-square blocks" JVET-L0279; JVET of ITU-T SG 16 WP3 and ISO/IEC JTC 1/SC 29 WG 11; Macao, CN; Oct. 3-12, 2018. 10 pages.

Examination Report for Indian Application No. 202117029572 dated Mar. 10, 2022. 6 pages with English translation.

* cited by examiner

INTRA PREDICTION METHOD AND DEVICE AND COMPUTER-READABLE STORAGE MEDIUM

CROSS-REFERENCE TO RELATED APPLICATION

This application is a continuation application of International PCT Application No. PCT/CN2019/070153 filed on Jan. 2, 2019, the entire content of which is hereby incorporated by reference.

TECHNICAL FIELD

Implementations of the present disclosure relate to an intra prediction technology in the video encoding field, and more particularly, to an intra prediction method and device and a computer storage medium.

BACKGROUND

In a luma prediction process for the next generation video coding standard H.266 or versatile video coding (VVC), in order to reduce the number of bits for entropy coding, a most probable modes (MPM) list will be constructed to store prediction modes of neighbouring blocks. Based on the principle that spatially neighbouring blocks have a high similarity, there is a high probability that the prediction mode selected by the current block will be the same as a certain mode existing in the MPM list. Therefore, the prediction mode of the current block can be encoded with fewer bits. However, due to the existence of wide angular modes of non-square blocks, an actual angle direction represented by an angular mode number may be different from the original meaning, which may cause that the angular modes with the same number in the MPM list represent different prediction directions for the neighbouring blocks and the current block, and there are many types of situations, so the accurate expression and use of the prediction mode of the current block are affected. Moreover, in a chroma prediction process, a direct mode (DM) will borrow a prediction mode of a luma block which is located at a center position of the current chroma block. Regardless of whether the prediction mode of the luma block is a wide angular mode or not, the DM will borrow the original angular mode number, which may cause a deviation between the actually used angular mode of the chroma block and an angular mode of its corresponding luma block. That is to say, in the wide angular mode, the angular mode number may correspond to different actual angular modes, such that angle conversion is more complicated in the luma prediction process, and there may be a deviation in the angular mode of the luma block borrowed in the chroma prediction, resulting in the problem of inaccurate prediction.

SUMMARY

Implementations of the present disclosure provide an intra prediction method and device, and a computer-readable storage medium, so as to effectively improve the accuracy of intra prediction while improving the efficiency of coding and decoding.

Technical schemes of the implementations of the present disclosure are implemented as follows.

An implementation of the present disclosure provides an intra prediction method including:

configuring actual angular modes represented by relative angle numbers; wherein the relative angle numbers successively represents the corresponding actual angular modes after sampling is performed at preset angle sampling points starting from starting angles within prediction direction ranges corresponding to preset width-height relationships; and the starting angles are determined according to the width-height relationships of processed blocks and the prediction direction ranges corresponding to the preset width-height relationships, and actual angles correspond to the actual angular modes one to one.

In the above scheme, when the sampling is performed at 65 preset angle sampling points, the relative angle numbers are consecutive numbers in a range from 2' to 66', the actual angular modes corresponding to the relative angle numbers are 65 consecutive actual angular modes in a range from −14 to 80, and selection of the 65 actual angular modes is determined by the width-height relationships, wherein the relative angle numbers correspond to the actual angular modes one to one in sequence.

In the above scheme, when the sampling is performed at 33 preset angle sampling points, the relative angle numbers are consecutive numbers in a range from 2' to 34', the actual angular modes corresponding to the relative angle numbers are 33 consecutive actual angular modes in a range from −7 to 41, and selection of the 33 actual angular modes is determined by the width-height relationships, wherein the relative angle numbers corresponding to the actual angular modes one to one in sequence.

In the above implementation, when the sampling is performed at 129 preset angle sampling points, the relative angle numbers are consecutive numbers in a range from 2' to 130', the actual angular modes corresponding to the relative angle numbers are 129 consecutive actual angular modes in a range from −28 to 158, and selection of the 129 actual angular modes is determined by the width-height relationships, wherein the relative angle numbers correspond to the actual angular modes one to one in sequence.

An implementation of the present disclosure further provides an intra prediction method including:

acquiring width-height relationships of reference blocks of a current block, prediction direction ranges corresponding to preset width-height relationships and preset angle sampling points;

determining actual angular modes corresponding to the reference blocks represented by relative angle numbers according to the width-height relationships, the prediction direction ranges corresponding to the preset width-height relationships and the preset angle sampling points, to cause actual angles to correspond to the actual angular modes one to one;

obtaining angular prediction modes corresponding to the reference blocks based on the actual angular modes corresponding to the reference blocks; and performing intra prediction for the current block based on the angular prediction modes.

In the above scheme, determining the actual angular modes corresponding to the reference blocks represented by the relative angle numbers according to the width-height relationships, the prediction direction ranges corresponding to the preset width-height relationships and the preset angle sampling points includes:

determining starting angles of angular modes of the reference blocks according to the width-height relationships and the prediction direction ranges corresponding to the preset width-height relationships;

determining angle offset ranges of the reference blocks based on the preset angle sampling points; and determining the actual angular modes corresponding to the reference blocks represented by the relative angle numbers according to the starting angles and the angle offset ranges.

In the above scheme, performing the intra prediction for the current block based on the angular prediction modes includes:

constructing a prediction mode list of the current block based on the angular prediction modes; and implementing the intra prediction for the current block using the prediction mode list.

In the above scheme, the intra prediction includes at least one of luma intra prediction and chroma intra prediction.

An implementation of the present disclosure provides an intra prediction device including:

a processor, a memory having stored therein intra prediction instructions executable by the processor, and a communication bus for connecting the processor and the memory, wherein the intra prediction instructions, when executed, implement the intra prediction methods described above.

An implementation of the present disclosure provides a computer-readable storage medium having intra prediction instructions stored therein, wherein the intra prediction instructions, when executed by a processor, implement the intra prediction methods described above.

In the implementations of the present disclosure, by using the above technical implementation scheme, the intra prediction device can use a unified approach for the actual angular modes to process the reference blocks with different width-height relationships in the intra prediction process, to cause the actual angles to correspond to the actual angular modes one to one, such that when a certain angle is represented, the angular modes of blocks of each shape can be specifically determined according to length to width ratios whether in a luma prediction process or in a chroma prediction process, to simplify angle conversion in wide angular modes, unify an angle value meaning represented by each mode, and eliminate a deviation, thereby improving the accuracy of the intra prediction effectively while improving the efficiency of coding and decoding.

DETAILED DESCRIPTION

Figure 1:
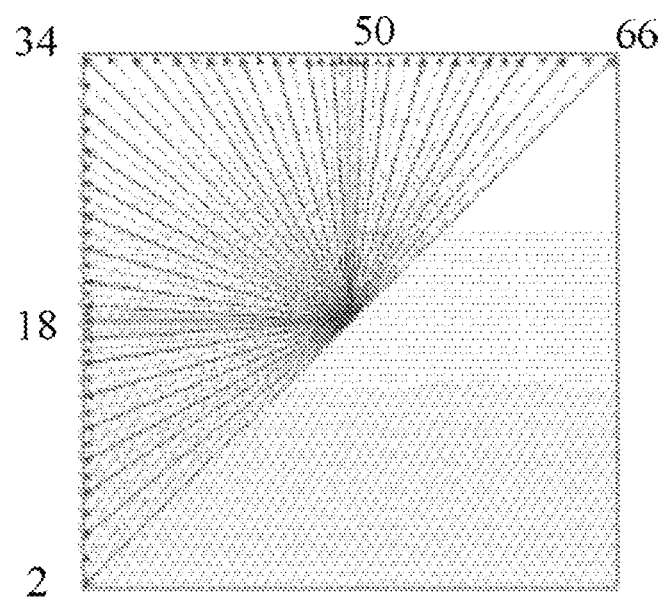
FIG. 1 is a schematic diagram of 67 intra prediction modes supported by VVC in accordance with an implementation of the present invention.

Technical schemes in implementations of the present disclosure will be clearly and completely described below in conjunction with the drawings in the implementations of the present disclosure. It may be understood that the specific implementations described herein are only intended to explain the relevant application, not limit the present disclosure. In addition, it should also be noted that for convenience of description, only the parts related to the relevant application are shown in the drawings.

Designations used in the present disclosure will be explained first below.

VVC/H.266: next generation video coding standard.

VTM: test model of VVC, which is a reference software test platform of VVC.

MPM: most probable mode.

DM: direct mode, which is a chroma prediction mode.

VER: vertical direction angular prediction mode, which corresponds to an intra prediction mode index 50 in VTM3.0.

HOR: horizontal direction angular prediction mode, which corresponds to an intra prediction mode index 18 in VTM3.0.

DIA: diagonal direction angular prediction mode, which corresponds to an intra prediction mode index 34 in VTM3.0.

VDIA: inverse diagonal direction angular prediction mode, which corresponds to an intra prediction mode index 66 in VTM3.0.

In the implementation of the present disclosure, a function of prediction coding is to construct a predictive value of the current block by using the existing reconstructed picture in space or time during video encoding, and only transmit a difference value between an original value and the predictive value, to achieve the purpose of reducing the amount of transmitted data. In luma prediction, the original value and predictive value herein may be an original value and predictive value of luma. In chroma prediction, the original value and predictive value herein may be an original value and predictive value of chroma.

A function of intra prediction is to construct a predictive value of the current block using sample units in the above row and sample units in the left column which are neighbouring to the current block. Each sample unit of the current block is predicted using the restored neighbouring samples around the current block (i.e., the sample units in the above neighbouring row and the sample units in the left neighbouring column of the current block).

For example, the current block is a luma block. When a luma predictive value of the current block is constructed using neighboring samples, luma prediction for the current block is carried out using a plurality of prediction directions in turn to obtain a luma predictive value matrix corresponding to each of the prediction directions. A difference matrix corresponding to each of the prediction directions is determined based on each luma predictive value matrix and a luma original value matrix of the current block. Evaluation parameter values corresponding to the prediction directions are determined based on each difference matrix, and the evaluation parameter values are used to indicate the prediction effect of the corresponding prediction directions on the current block. A target prediction direction is determined from the plurality of prediction directions based on each of the evaluation parameter values. For example, on the premise of ensuring the video restoration quality, a prediction direction in which the minimum quantity of bits for picture coding can be obtained is determined as the target prediction direction. Then the target prediction direction is written into a bitstream.

Illustratively, 67 intra prediction directions, i.e., prediction modes, are supported by VVC, where the intra prediction directions with index numbers 2-66 are shown in FIG. 1.

It should be noted that in order to adapt to the increasing demand for video resolution and express directions of video contents more precisely and accurately, 33 luma intra prediction angular modes defined in H.265/HEVC is expanded to 65 luma intra prediction angular modes in H.266/VVC. The newly added angular modes are indicated by dashed arrows in FIG. 1. Number 0 represents a planar mode, number 1 represents a DC mode, and numbers 2-66 represent 65 angular modes (from bottom-left to top-right), with a total of 67 intra prediction modes, where 2-66 herein are absolute angle numbers.

In the implementation of the present disclosure, an intra prediction direction with an index number 66 it taken as an example to propose a method of constructing a luma predictive value of each of the sample units of the current block. Data in the above neighbouring row of the current block are sample units that have been predicted. Each of the sample units of the current block is filled according to the sample unit with the top-right diagonal (i.e., the prediction direction with the index number 66).

In addition, there are two ways to construct prediction blocks in a relative flat manner, the DC mode and the PLANAR mode, respectively. In the DC mode, the whole current block is filled with an average value of feature values (e.g., chroma values or luma values) in the previous row or the left column, while in the PLANAR mode, the current block is filled in a gradual manner.

Luma modes are predicted according to 0-66 directions in FIG. 1 in turn, and a prediction direction that best matches the current block (e.g., in which the difference value is smallest or the rate distortion cost is smallest) is selected as the target prediction direction, and the luma predictive value of each of the sample units of the current block is constructed, which is the basic principle of luma intra prediction. After obtaining the target prediction direction and a difference value corresponding to each of the sample units corresponding to the target prediction direction, an encoder writes the difference value corresponding to each of the sample units and an index number of the target prediction direction corresponding to the current block into a bitstream. After receiving the bitstream, the decoder analyzes the received bitstream to obtain the index number of the target prediction direction, and could then calculate the luma predictive value of each of the sample units in the corresponding current block, and adds the luma predictive value to the difference value obtained by analyzing bitstream in order to obtain a luma reconstructed value of the corresponding sample unit.

Figure 2A:
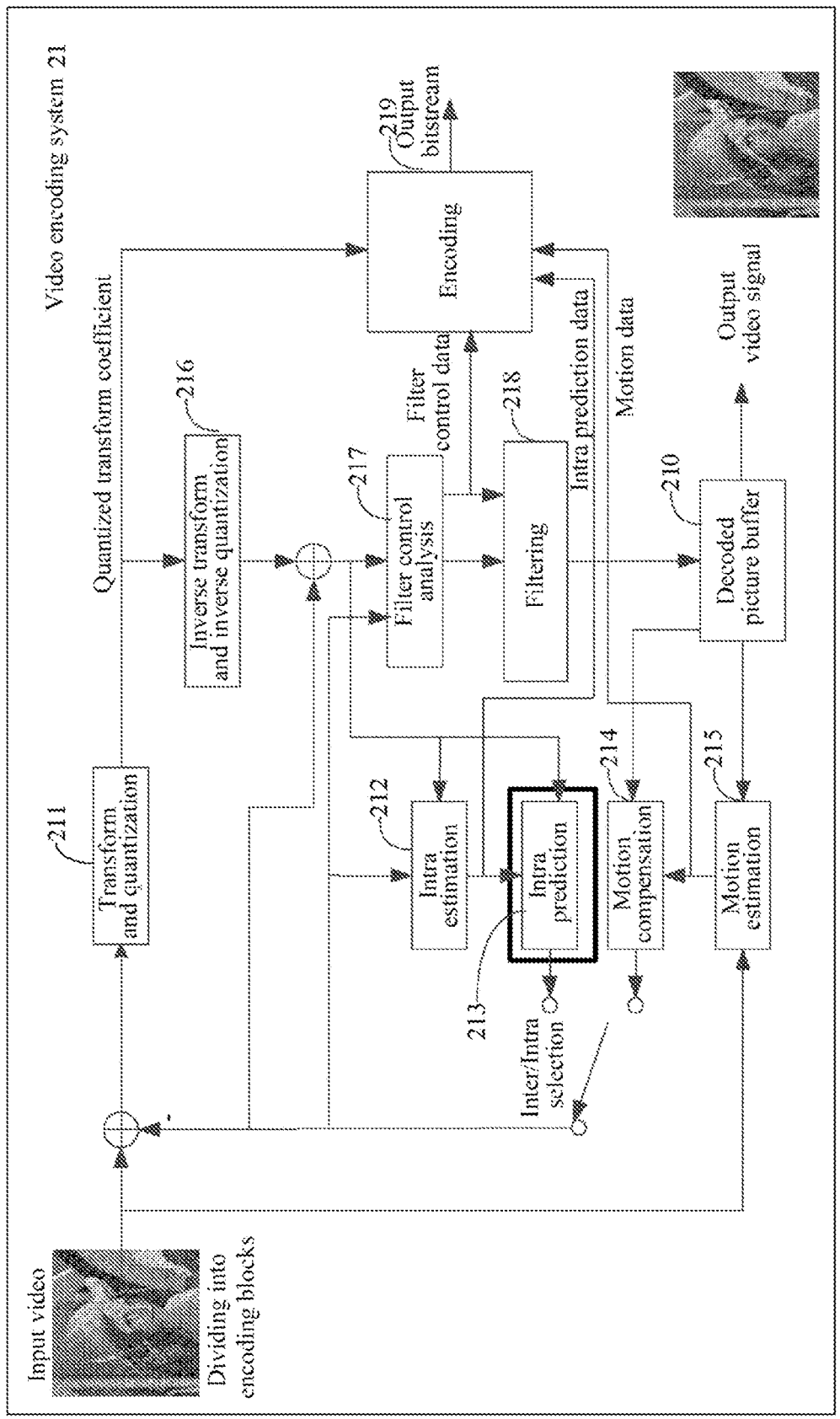
FIG. 2A is a schematic diagram of a compositional structure of a video encoding system in accordance with an implementation of the present requisition.

On the basis of the known basic concepts described above, a video encoding system is provided. FIG. 2A is a schematic diagram of a compositional structure of a video encoding system in accordance with an implementation of the present implementation. As shown in FIG. 2A, the video encoding system 21 includes:

a transform and quantization unit 211, an intra estimation unit 212, an intra prediction unit 213, a motion compensation unit 214, a motion estimation unit 215, an inverse transform and inverse quantization unit 216, a filter control analysis unit 217, a filtering unit 218, an encoding unit 219 and a decoded picture buffer unit 210. For the input original video signal, a video reconstructed block can be obtained by dividing based on coding tree units (CTUs). Then, for residual sample information obtained after intra or inter-frame prediction, the video reconstructed block is transformed by the transform and quantization unit 211, including transforming the residual information from a sample domain to a transform domain, and quantizing the obtained transform coefficients to further reduce the bit rate. The intra estimation unit 212 and the intra prediction unit 213 are used to perform intra prediction for the video reconstructed block. The intra estimation unit 212 and the intra prediction unit 213 are used to determine the optimal intra prediction direction (i.e., the target prediction direction) of the video reconstructed block. The motion compensation unit 214 and the motion estimation unit 215 are used to perform inter-frame prediction coding of the received video reconstructed block with respect to one or more blocks in one or more reference frames to provide temporal prediction information. Motion estimation performed by the motion estimation unit 215 is a process of generating motion vectors that can be used to estimate the motion of the video reconstructed block, and then the motion compensation unit 214 performs motion compensation based on the motion vectors determined by the motion estimation unit 215. After intra prediction directions are determined, the intra prediction unit 213 is also used to provide the selected intra prediction data to the encoding unit 219, and the motion estimation unit 215 sends the calculated and determined motion vector data to the encoding unit 219. In addition, the inverse transform and inverse quantization unit 216 is used for reconstructing the video reconstructed block, and reconstructing residual blocks in the sample domain. Blocking artifacts are removed from the reconstructed residual blocks by the filter control analysis unit 217 and the filtering unit 218, and then the reconstructed residual blocks are added to a predictive block in a frame of the decoded picture buffer unit 210 to generate reconstructed video reconstructed blocks. The encoding unit 219 is used to encode various encoding parameters and quantized transform coefficients. In a CABAC-based encoding algorithm, the context content can be based on neighbouring reconstructed blocks, and can be used to encode information indicating the determined intra prediction directions to output a bitstream of the video signal. The decoded picture buffer unit 210 is used to store the reconstructed video reconstructed blocks for prediction reference. With the progress of video picture coding, new reconstructed video reconstructed blocks will be generated continuously, and will all be stored in the decoded picture buffer unit 210.

Figure 2B:
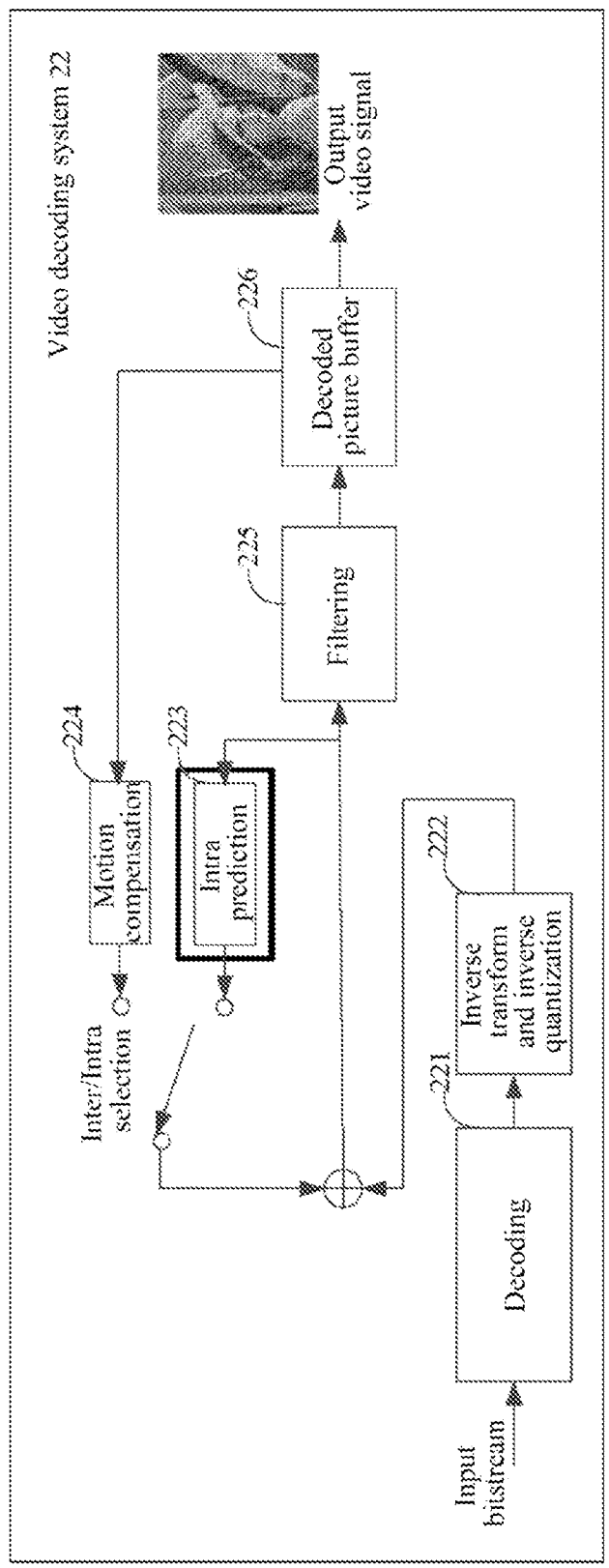
FIG. 2B is a schematic diagram of a compositional structure of a video decoding system in accordance with an implementation of the present requisition.

An implementation of the present disclosure provides a video decoding system. FIG. 2B is a schematic diagram of a compositional structure of a video decoding system in accordance with an implementation of the present requisition. As shown in FIG. 2B, the video decoding system 22 includes:

a decoding unit 221, an inverse transform and inverse quantization unit 222, an intra prediction unit 223, a motion compensation unit 224, a filtering unit 225 and a decoded picture buffer unit 226. After the input video signal is encoded by the video encoding system 21, a bitstream of the video signal is output. The bitstream is input into the video decoding system 22, and passes first through the decoding unit 221 to obtain the decoded transform coefficients. The transform coefficients are processed by the inverse transform and inverse quantization unit 222 to generate residual blocks in the sample domain. The intra prediction unit 223 can be used to generate prediction data of the current video decoding block based on the determined intra prediction directions and data from the previous decoded blocks of the current frame or picture. The motion compensation unit 224 determines prediction information for video decoding blocks by parsing motion vectors and other associated syntax elements, and uses the prediction information to generate predictive blocks of the video decoding blocks being decoded. The decoded video blocks are formed by summing the residual blocks from the inverse transform and inverse quantization unit 222 and the corresponding prediction blocks generated by the intra prediction unit 223 or the motion compensation unit 224. The decoded video signal passes through the filtering unit 225 to remove blocking artifacts, so as to improve the video quality. Then, the decoded video blocks are stored in the decoded picture buffer unit 226, which stores reference pictures for subsequent intra prediction or motion compensation, and is also used for output of the video signal to obtain the restored original video signal.

The implementation of the present disclosure mainly acts on the intra prediction unit 213 of the video encoding system 21 and the intra prediction unit 223 of the video decoding system 22. That is to say, if a better prediction effect can be obtained in the video encoding system 21 through the intra prediction method in accordance with the implementation of the present disclosure, then accordingly, the video decoding recovery quality can be improved at the decoding end as well.

Based on this, the technical schemes of the present disclosure will be further set forth in detail in conjunction with the drawings and implementations.

It should be noted that an intra prediction device in accordance with an implementation of the present disclosure may be either an encoder or a decoder, and the implementation of the present disclosure is not limited thereto.

An implementation of the present disclosure provides an intra prediction method, which may include:

configuring actual angular modes represented by relative angle numbers; wherein the relative angle numbers successively represents the corresponding actual angular modes after sampling is performed at preset angle sampling points starting from starting angles within prediction direction ranges corresponding to preset width-height relationships; and the starting angles are determined according to the width-height relationships of a processed block and the prediction direction ranges corresponding to the preset width-height relationships, and actual angles correspond to the actual angular modes one to one.

The intra prediction method provided by the implementation of the present disclosure relates to a process of writing prediction numbers of prediction modes of the current block into a bitstream for encoding and decoding.

Wide angular modes will be described below by taking 65 angle intra prediction modes. In the wide angular modes, as shown in FIG. 1, prediction directions of 65 angle intra prediction modes are defined to be between 45 degrees (mode 66) and −135 degrees (mode 2) in the clockwise direction. Considering the addition of a QTBT coding block partition structure in H.266/VVC, some non-square coding blocks will be generated. For the non-square coding blocks, expanded wide angular modes will be used instead of several traditional angle intra prediction modes. The number of traditional angular modes that need to be replaced is related to a width to height ratio of the current coding block. The larger the ratio is, the more the traditional angular modes which need to be replaced with the wide angular modes are.

There are 85 angular direction modes and DC and planar modes in VTM2.0.1, wherein 20 angle directions are beyond a range between −135 degrees and 45 degrees, that is, wide angles. The angle directions within a range from −135 degrees (mode 2) to 45 degrees (mode 66) in the clockwise direction is designed for square blocks and includes diagonal directions of all square blocks (modes 2, 34 and 66). However, for non-square blocks, their diagonal directions are not always covered. In addition, angle directions of the square blocks start from the bottom-left diagonal direction to the top-right diagonal direction, while angle directions of the non-square blocks do not.

Figure 3:
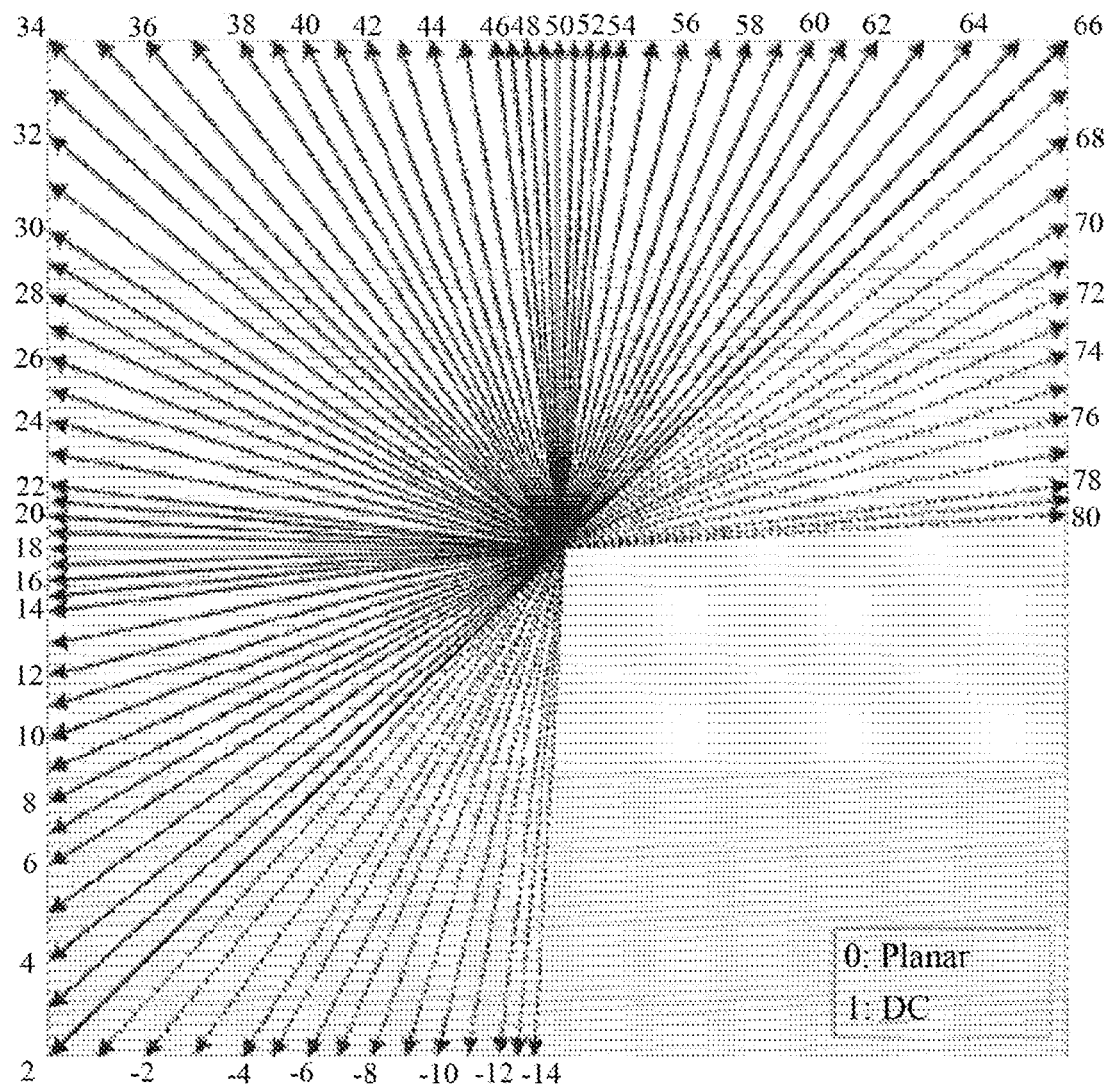
FIG. 3 is a schematic diagram of intra prediction modes of exemplary wide angular modes in accordance with an implementation of the present disclosure.

As shown in FIG. 3, there are 93 angular direction modes and DC and planar modes, wherein 28 angle directions are beyond the range between 45 degrees and −135 degrees, that is, wide angles.

A unified wide angular mode proposed by the L0279 proposal is accepted in the latest H.266/VVC reference software VTM3.0. The proposal puts forward three improvements:

angular modes of the current coding block are limited to be from the bottom-left diagonal direction to the top-right diagonal direction;

the expanded wide angular modes of the current coding block are limited to include always the bottom-left and top-right diagonal directions; and reference ranges are unified, wherein the upper reference range is 2*W+1 and the left reference range is 2*H+1, wherein W is a width of a block (coding block) and H is a length of a block (coding block).

It should be noted that the unified method proposed in the L0279 proposal has modified the number of traditional modes that need to be replaced with wide angular modes, such that the angle range after the expansion of the wide angles is just between the bottom-left diagonal direction and the top-right diagonal direction (for example, between 2 and 66), as shown in Table 1. At the same time, the method has also modified appropriately directions of the expanded wide angular modes and the traditional angular modes that need to be replaced, such that the diagonal directions of the current coding block in the case of various width to height ratios are included.

TABLE 1

| Width-height relationship of coding block | Traditional intra modes that need to be replaced with wide angular modes |
|---|---|
| W/H = = 2 | Modes 2, 3, 4, 5, 6, 7 — — 67, . . . , 72 |
| W/H = = 4 | Modes 2, 3, 4, 5, 6, 7, 8, 9, 10, 11 — — 67, . . . , 76 |

TABLE 1-continued

| Width-height relationship of coding block | Traditional intra modes that need to be replaced with wide angular modes |
|---|---|
| W/H = = 8 | Modes 2, 3, 4, 5, 6, 7, 8, 9, 10, 11, 12, 13 — — 67, . . . , 78 |
| W/H = = 16 | Modes 2, 3, 4, 5, 6, 7, . . . , 14, 15 — — 67, . . . , 80 |
| W/H = = 1 | None |
| H/W = = 2 | Modes 61, 62, 63, 64, 65, 66 — — −6, . . . , −1 |
| H/W = = 4 | Modes 57, 58, 59, . . . , 64, 65, 66 — — −10, . . . , −1 |
| H/W = = 8 | Modes 55, 56, 57, 58, 59, . . . , 65, 66 — — −12, . . . , −1 |
| H/W = = 16 | Modes 53, 54, 55, 56, 57, 58, . . . , 66 — — −14, . . . , −1 |

Here, when the width to height ratio (or height to width ratio, the same goes for the following) is 2, 6 modes need to be replaced; when the width to height ratio is 4, 10 modes need to be replaced; when the width to height ratio is 8, 12 modes need to be replaced; and when the width to height ratio is 16, 14 modes need to be replaced.

That is to say, as shown in FIG. 3, number ranges of all angular modes are from −14 to 80, but the angular modes are represented through the substitution method in table 1 using consecutive numbers of 2-66.

In the implementation of the present disclosure, the actual angular modes represented by the relative angle numbers are used when the intra prediction device configures or identifies the angular modes; wherein the relative angle numbers successively represents the corresponding actual angular modes after sampling is performed at the preset angle sampling points starting from the starting angles within the prediction direction ranges corresponding to the preset width-height relationships; and the starting angles are determined according to the width-height relationships of the processed blocks and the prediction direction ranges corresponding to the preset width-height relationships.

Specifically, the intra prediction device can determine the starting angles of the angular modes of the reference blocks according to the width-height relationships of the processed blocks and the prediction direction ranges corresponding to the preset width-height relationships; determine angle offset ranges of the reference blocks based on the preset angle sampling points; and determine the actual angular modes corresponding to the processed blocks represented by the relative angle numbers according to the starting angles and the angle offset ranges.

It should be noted that in the implementation of the present disclosure, the width-height relationships and the prediction direction ranges determine the starting angles. The prediction direction ranges indicate what the angular modes of the preset angle sampling points selected from all angular modes are. Prediction direction range is known in the prior art. Referring to Table 1, for example, when the width to height ratio is 2, the prediction direction range is the 65 angular modes within a range from 8-72.

In some implementations of the present disclosure, when the sampling is performed at 65 preset angle sampling points, the relative angle numbers are consecutive numbers in a range from 2' to 66', the actual angular modes corresponding to the relative angle numbers are 65 consecutive actual angular modes in a range from −14 to 80, and selection of the 65 actual angular modes is determined by the width-height relationships, wherein the relative angle numbers correspond to the actual angular modes one to one.

In the implementation of the present disclosure, 2'-66' is used to represent the actual angular modes corresponding to the relative angles represented by numbers of 2-66. That is to say, the actual angular modes represented by consecutive numbers in the range from 2'-66' are 65 actual angular modes corresponding to 65 actual angles in an angle range from [a starting value angle+a lower limit value of an angle offset range, a starting value angle+an upper limit value of the angle offset range].

In the implementation of the present disclosure, the angle offset range is [0—the number of the preset angle sampling points −1]. For example, when t the number of the preset angle sampling points is 65, the angle offset range is [0-64].

Illustratively, in the implementation of the present disclosure, taking the number of the preset angle sampling points, i.e., angle directions, being 65 as an example, the preset width-height relationships, meanings of starting angular modes represented by 2', the relative angle numbers, and meanings representing the actual angular modes are shown in Table 2.

TABLE 2

| Width to height ratio of reference block | Meaning of starting angular mode represented by 2' | Relative angle number | Meaning representing actual angular mode |
|---|---|---|---|
| W/H = 2 | 8 | 2'~66' | 8~72 |
| W/H = 4 | 12 | 2'~66' | 12~76 |
| W/H = 8 | 14 | 2'~66' | 14~78 |
| W/H = 16 | 16 | 2'~66' | 16~80 |
| W/H = 1 | 2 | 2'~66' | 2~66 |
| H/W = 2 | −6 | 2'~66' | −6~60 |
| H/W = 4 | −10 | 2'~66' | −10~56 |
| H/W = 8 | −12 | 2'~66' | −12~54 |
| H/W = 16 | −14 | 2'~66' | −14~52 |

It can be understood that in such a representation method, absolute numbers of all angular modes are represented in a range [−14, 80] with reference to the representation method for the actual angular modes in the L0279 proposal. No matter what width to height ratio the current coding block has, only 65 consecutive angular modes, i.e., 65 angle numbers, are contained. The selection range (that is, the prediction direction range) of the 65 angle numbers will be different due to the width to height ratios. In the representation method of the implementation of the present disclosure, the modes from the bottom-left diagonal direction to the top-right diagonal direction are fixed to be 2'-66' (relative angle numbers) regardless of whether there is wide angular mode expansion. However, due to different width to height ratios, the meanings of the actual angular modes represented by the starting angle numbers of the relative angle numbers will be different. Although ranges of the relative angle numbers fall into different intervals due to differences in the prediction direction ranges, they all belong to the range [−44,80]. For example, when W/H=2, a relative angle number in the bottom-left diagonal direction is 2', which actually represents the first value of a starting angle+an angle offset range, that is, an actual angular mode of 8+0 (the angle numbers in FIG. 3 are used to represent the actual angles); a relative angle number 3' represents an actual angular mode of 8+1 (the second value of the angle offset range) (i.e., mode 9 represented in FIG. 3), . . . , and a relative angle number 66' represents an actual angular mode of 8+64 (the $65^{th}$ value of the angle offset range) (i.e., mode 72 represented in FIG. 3).

The representation method of the implementation of the present disclosure can avoid a deviation between an angle direction of an MPM list storage mode and an angle direction of an actual neighbouring block due to the fact that both of the angle directions are represented by the same angular mode number, in a luma prediction process. Meanwhile, it avoids a deviation between a luma direction borrowed at the center position of the current chroma block and an actual luma direction in a chroma prediction process.

It should be noted that in the representation method using the relative angle numbers provided in the implementation of the present disclosure, the relative angle numbers are put into a bitstream for transmission in a form of syntax elements during coding, and a decoder appoints the meanings of the relative angle numbers with different width to height ratios during decoding, so the actual angular modes corresponding to the relative angle numbers can be analyzed through the received relative angle numbers.

In some implementations of the present disclosure, when the sampling is performed at 33 preset angle sampling points, the relative angle numbers are consecutive numbers in a range from 2' to 34', the actual angular modes corresponding to the relative angle numbers are 33 consecutive actual angular modes in a range from −7 to 41, and selection of the 33 actual angular modes is determined by the width-height relationships, wherein the relative angle numbers correspond to the actual angular modes one to one.

Illustratively, in the implementation of the present disclosure, taking the number of the preset angle sampling points, i.e., angle directions, being 33 as an example, the preset width-height relationships, meanings of starting angular modes represented by 2', the relative angle numbers, and meanings representing the actual angular modes are shown in Table 3.

TABLE 3

| Width to height ratio of reference block | Meaning of starting angular mode represented by 2' | Relative angle number | Meaning representing actual angular mode |
| --- | --- | --- | --- |
| W/H = 2 | 5 | 2'~34' | 5~37 |
| W/H = 4 | 7 | 2'~34' | 7~39 |
| W/H = 8 | 8 | 2'~34' | 8~40 |
| W/H = 16 | 9 | 2'~34' | 9~41 |
| W/H = 1 | 2 | 2'~34' | 2~34 |
| H/W = 2 | −3 | 2'~34' | −3~31 |
| H/W = 4 | −5 | 2'~34' | −5~29 |
| H/W = 8 | −6 | 2'~34' | −6~28 |
| H/W = 16 | −7 | 2'~34' | −7~27 |

In some implementations of the present disclosure, when the sampling is performed at 129 preset angle sampling points, the relative angle numbers are consecutive numbers in a range from 2' to 130', the actual angular modes corresponding to the relative angle numbers are 129 consecutive actual angular modes in a range from −28 to 158, and selection of the 129 actual angular modes is determined by the width-height relationships, wherein the relative angle numbers correspond to the actual angular modes one to one.

Illustratively, in the implementation of the present disclosure, taking the number of the preset angle sampling points, i.e., angle directions, being 129 as an example, the preset width-height relationships, meanings of starting angular modes represented by 2', the relative angle numbers, and meanings representing the actual angular modes are shown in Table 4.

TABLE 4

| Width to height ratio of reference block | Starting angle | Angle offset range | Actual angular mode |
| --- | --- | --- | --- |
| W/H = 2 | 14 | 2'~130' | 14~142 |
| W/H = 4 | 22 | 2'~130' | 22~150 |
| W/H = 8 | 26 | 2'~130' | 26~154 |
| W/H = 16 | 30 | 2'~130' | 30~158 |
| W/H = 1 | 2 | 2'~130' | 2~130 |
| H/W = 2 | −12 | 2'~130' | −12~118 |
| H/W = 4 | −20 | 2'~130' | −20~110 |
| H/W = 8 | −24 | 2'~130' | −24~106 |
| H/W = 16 | −28 | 2'~130' | −28~102 |

In the implementation of the present disclosure, the number of the preset angle sampling points is not limited.

Figure 4:
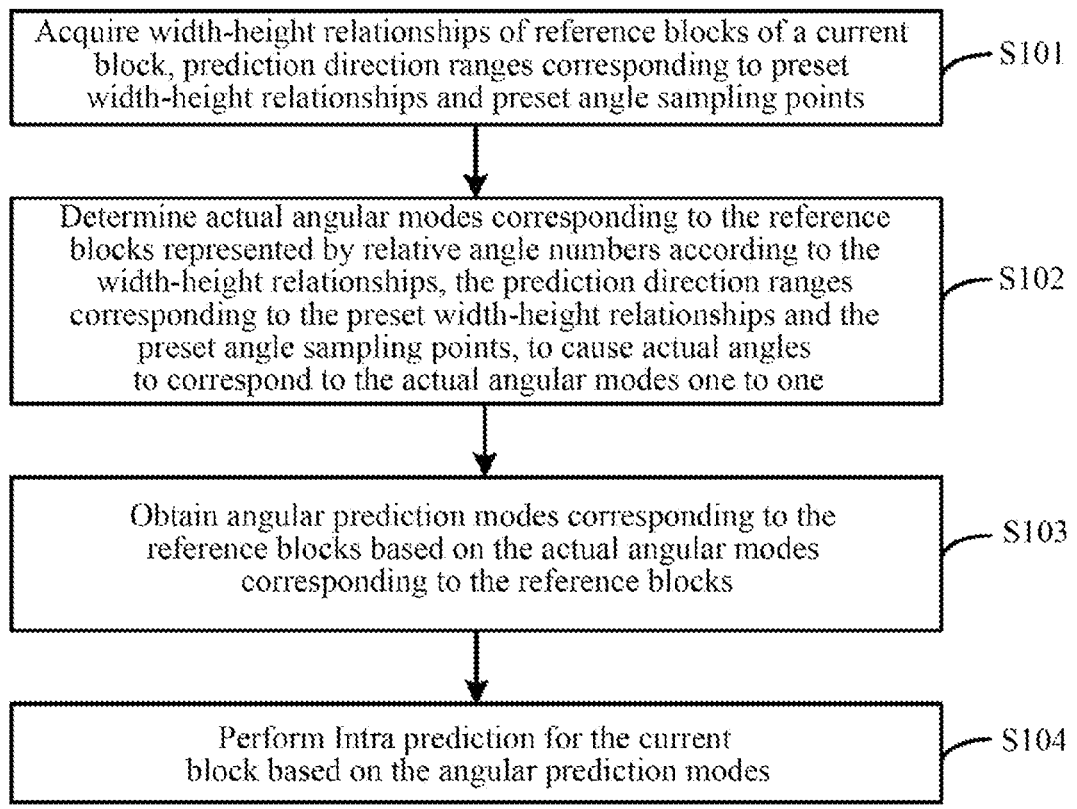
FIG. 4 is a flowchart of an intra detection method in accordance with an implementation of the present disclosure.

An implementation of the present disclosure provides an intra prediction method, which, as shown in FIG. 4, may include the following steps.

In S101, width-height relationships of reference blocks of a current block, prediction direction ranges corresponding to preset width-height relationships and preset angle sampling points are acquired.

In S102, actual angular modes corresponding to the reference blocks represented by relative angle numbers are determined according to the width-height relationships, the prediction direction ranges corresponding to the preset width-height relationships and the preset angle sampling points, to cause actual angles to correspond to the actual angular modes one to one.

In S103, angular prediction modes corresponding to the reference blocks are obtained based on the actual angular modes corresponding to the reference blocks.

In S104, intra prediction for the current block is performed based on the angular prediction modes.

In the implementation of the present disclosure, the reference blocks are data blocks within a preset range where the current block is located and for which the intra prediction is completed, and the reference blocks may be at least one.

It should be noted that the intra prediction device performs the intra prediction, which includes at least one of luma intra prediction and chroma intra prediction. The luma intra prediction uses neighbouring blocks as the reference blocks, and the chroma intra prediction can borrow luma blocks at the center positions of the previous chroma blocks as the reference block. Chroma prediction modes can include DM, LM, LM_T, LM_L and the like.

In some implementations of the present disclosure, the prediction modes include at least one of luma intra prediction directions and chroma intra prediction directions.

It can be understood that when the prediction directions are the luma intra prediction directions, the prediction directions of the reference blocks are luma directions, thus, when the intra prediction is performed for the current block in S104, the intra prediction is performed for the luma of the current block actually. Similarly, when the prediction directions are chroma intra prediction directions, the prediction directions of the reference blocks are chroma directions, thus, when the intra prediction is performed for the current block in S104, the intra prediction is performed for the chroma of the current block actually.

In S101, no matter whether the intra prediction device performs the luma intra prediction or the chroma intra prediction, the intra prediction device can obtain the width-height relationships of the reference blocks of the current block, the prediction direction ranges corresponding to the preset width-height relationships and the preset angle sampling points in the process of obtaining the prediction modes of the current block.

In the implementation of the present disclosure, the width-height relationships of the reference blocks may be width to height ratios or height to width ratios, and the implementation of the present disclosure is not limited thereto.

In the implementation of the present disclosure, the prediction direction ranges corresponding to the preset width-height relationships are the actual angle ranges including the number of consecutive preset angle sampling points between the bottom-left diagonal direction and the top-right diagonal direction, which are obtained for different width-height relationships of a processed block.

In the implementation of the present disclosure, the number of the preset angle sampling points is the number of sampling points between the bottom-left diagonal direction and the top-right diagonal direction.

It should be noted that the intra prediction device can obtain the width-height relationships of the reference blocks of the current block and the prediction direction ranges corresponding to the preset width-height relationships, determine the preset angle sampling points in each of the prediction direction ranges, and select the relative angle numbers between the prediction directions and starting angles.

Illustratively, 65 angle intra prediction modes are taken as an example. The prediction directions of the 65 angle intra prediction modes are defined to be between −135 degrees (mode 2) to 45 degrees (mode 66) in the clockwise direction, where [2', 66'] here are the relative angle numbers.

In the implementation of the present disclosure, in the case that the number of the preset angle sampling points is certain, lengths of the prediction direction ranges of all angular modes are the same. No matter what width-height relationship the current block has, only a number, which is the number of the consecutive preset angle sampling points, of angles (i.e., the relative angle numbers) are contained, except that a number, which is the number of the preset angle sampling points, of actual angular modes selected from the length of the prediction direction ranges will be different due to the width-height relationships.

In S102, after the intra prediction device obtains the width-height relationships of the reference blocks of the current block, the prediction direction ranges corresponding to the preset width-height relationships and the preset angle sampling points, the intra prediction device can determine the actual angular modes corresponding to the reference blocks represented by relative angle numbers according to the width-height relationships, the prediction direction ranges corresponding to the preset width-height relationships and the preset angle sampling points, to cause the actual angles to correspond to the actual angular modes one to one. S102 is implemented in S1021-1023 specifically below.

In S1021, the starting angles of the angular modes of the reference blocks are determined according to the width-height relationships and the prediction direction ranges corresponding to the preset width-height relationships.

In S1022, angle offset ranges of the reference blocks are determined based on the preset angle sampling points.

In S1023, the actual angular modes corresponding to the reference blocks represented by the relative angle numbers are determined according to the starting angles and the angle offset ranges.

After obtaining the width-height relationships and the prediction direction ranges corresponding to the preset width-height relationships, the intra prediction device can determine the starting angles of the angular modes of the reference blocks according to the width-height relationships and the prediction direction ranges corresponding to the preset width-height relationships, and determine the angle offset ranges of the reference blocks based on the preset angle sampling points; and determine the actual angular modes corresponding to the reference blocks represented by the relative angle numbers according to the starting angles and the angle offset ranges, such that the intra prediction device can select the actual angular modes within the angle offset ranges with the relative angle numbers starting from the starting angles.

In some implementations of the present disclosure, the relative angle numbers can be used to represent angles, thus, the intra prediction device can determine relative angle starting numbers of the starting angles of the angular modes of the reference blocks according to the width-height relationships and the prediction direction ranges corresponding to the preset width-height relationships; determine the angle offset ranges of the reference blocks to be [0-the number of the preset angle sampling points-1] based on the preset angle sampling points; and determine the actual angular modes corresponding to the reference blocks represented successively by the consecutive numbers in the range of relative angle numbers [2'-66'] according to the starting numbers and the angle offset ranges.

Illustratively, in the implementation of the present disclosure, taking the number of the preset angle of sampling points, i.e., angle directions, being 65 as an example, the preset width-height relationships, meanings of starting angular modes represented by 2', the relative angle numbers, and meanings representing the actual angular modes are shown in Table 2.

TABLE 2

| Width to height ratio of reference block | Meaning of starting angular mode represented by 2' | Relative angle number | Meaning representing actual angular mode |
|---|---|---|---|
| W/H = 2 | 8 | 2'~66' | 8~72 |
| W/H = 4 | 12 | 2'~66' | 12~76 |
| W/H = 8 | 14 | 2'~66' | 14~78 |
| W/H = 16 | 16 | 2'~66' | 16~80 |
| W/H = 1 | 2 | 2'~66' | 2~66 |
| H/W = 2 | −6 | 2'~66' | −6~60 |
| H/W = 4 | −10 | 2'~66' | −10~56 |
| H/W = 8 | −12 | 2'~66' | −12~54 |
| H/W = 16 | −14 | 2'~66' | −14~52 |

It can be understood that in such a representation method, absolute numbers of all angular modes are represented in a range [−14, 80] with reference to the representation method for the actual angular modes in FIG. 3 in the L0279 proposal. No matter what width to height ratio the current coding block has, only 65 consecutive angle numbers are contained, except that the selection range of the 65 angle numbers will be different due to the width to height ratios. In this new representation method, the modes from the bottom-left diagonal direction to the top-right diagonal direction are represented by the relative angle numbers 2'-66' regardless of whether there is wide angular mode expansion. However, due to different width to height ratios, the starting angle numbers of the angular modes will be different, such that the number ranges of all angles fall into different intervals eventually, but all in the range [−14,80]. For example, when W/H=2, a relative angle number in the bottom-left diagonal direction is 2', which actually represents the first value of a starting angle+an angle offset range, that is, an actual angular mode of 8+0 (the angle numbers in FIG. 3 are used to represent the actual angles); a relative angle number 3' represents an actual angular mode of 8+1 (the second value of the angle offset range) (i.e., mode 9 represented in FIG. 3), . . . , and a relative angle number 66' represents an actual angular mode of 8+64 (the 65$^{th}$ value of the angle offset range) (i.e., mode 72 represented in FIG. 3). The representation method of the implementation of the present disclosure can avoid a deviation between an angle direction of an MPM list storage mode and an angle direction of an actual neighbouring block due to the fact that both of the angle directions are represented by the same angular mode number, in a luma prediction process. Meanwhile, it avoids a deviation between a luma direction borrowed at the center position of the current chroma block and an actual luma direction in a chroma prediction process.

It should be noted that in the representation method using the relative angle numbers provided in the implementation of the present disclosure, the relative angle numbers are put into a bitstream for transmission in a form of syntax elements during coding, and a decoder appoints the meanings of the relative angle numbers with different width to height ratios during decoding, so the actual angular modes corresponding to the relative angle numbers can be analyzed through the received relative angle numbers.

It can be understood that the relative angle numbers are transmitted as the syntax elements of the angular mode numbers in the bitstream, thus the acquisition of the real prediction angles by a codec in the wide angular modes is simplified, which is conducive to improvement of the efficiency of encoding and decoding.

In some implementations of the present disclosure, when the sampling is performed at 33 preset angle sampling points, the relative angle numbers are consecutive numbers in a range from 2' to 34', the actual angular modes corresponding to the relative angle numbers are 33 consecutive actual angular modes in a range from −7 to 41, and selection of the 33 actual angular modes is determined by the width-height relationships, wherein the relative angle numbers correspond to the actual angular modes one to one in sequence.

Illustratively, in the implementation of the present disclosure, taking the number of the preset angle sampling points, i.e., angle directions, being 33 as an example, the preset width-height relationships, meanings of starting angular modes represented by 2', the relative angle numbers, and meanings representing the actual angular modes are shown in Table 3.

TABLE 3

| Width to height ratio of reference block | Meaning of starting angular mode represented by 2' | Relative angle number | Meaning representing actual angular mode |
|---|---|---|---|
| W/H = 2 | 5 | 2'~34' | 5~37 |
| W/H = 4 | 7 | 2'~34' | 7~39 |
| W/H = 8 | 8 | 2'~34' | 8~40 |
| W/H = 16 | 9 | 2'~34' | 9~41 |
| W/H = 1 | 2 | 2'~34' | 2~34 |
| H/W = 2 | −3 | 2'~34' | −3~31 |
| H/W = 4 | −5 | 2'~34' | −5~29 |
| H/W = 8 | −6 | 2'~34' | −6~28 |
| H/W = 16 | −7 | 2'~34' | −7~27 |

In some implementations of the present disclosure, when the sampling is performed at 129 preset angle sampling points, the relative angle numbers are consecutive numbers in a range from 2' to 130', the actual angular modes corresponding to the relative angle numbers are 129 consecutive actual angular modes in a range from −28 to 158, and selection of the 129 actual angular modes is determined by the width-height relationships, wherein the relative angle numbers correspond to the actual angular modes one to one in sequence.

Illustratively, in the implementation of the present disclosure, taking the number of the preset angle sampling points, i.e., angle directions, being 129 as an example, the preset width-height relationships, meanings of starting angular modes represented by 2', the relative angle numbers, and meanings representing the actual angular modes are shown in Table 4.

TABLE 4

| Width to height ratio of reference block | Starting angle | Angle offset range | Actual angular mode |
|---|---|---|---|
| W/H = 2 | 14 | 2'~130' | 14~142 |
| W/H = 4 | 22 | 2'~130' | 22~150 |
| W/H = 8 | 26 | 2'~130' | 26~154 |
| W/H = 16 | 30 | 2'~130' | 30~158 |
| W/H = 1 | 2 | 2'~130' | 2~130 |
| H/W = 2 | −12 | 2'~130' | −12~118 |
| H/W = 4 | −20 | 2'~130' | −20~110 |
| H/W = 8 | −24 | 2'~130' | −24~106 |
| H/W = 16 | −28 | 2'~130' | −28~102 |

In the implementation of the present disclosure, the number of the preset angle sampling points is not limited.

In S103, the intra prediction device obtains the angular prediction modes corresponding to the reference blocks based on the actual angular modes corresponding to the reference blocks.

After obtaining the actual angular modes corresponding to the reference blocks, the intra prediction device can use the actual angular modes to represent the angular prediction modes (e.g., dirA, dirB) corresponding to the reference blocks.

That is to say, in the implementation of the present disclosure, the angular prediction modes corresponding to the reference blocks obtained by the intra prediction device represent a one-to-one correspondence between the actual angles and the actual angular modes.

In S104, the intra prediction device may perform the intra prediction for the current block based on the angular prediction modes. Here, the intra prediction device needs to construct a prediction mode list of the current block based on the angular prediction modes; and then implement the intra prediction for the current block using the prediction mode list.

In the implementation of the present disclosure, for the luma intra prediction, the prediction mode list is an MPM list.

For the chroma intra prediction, the prediction mode list is a DM list or a MDMS list.

Figure 5:
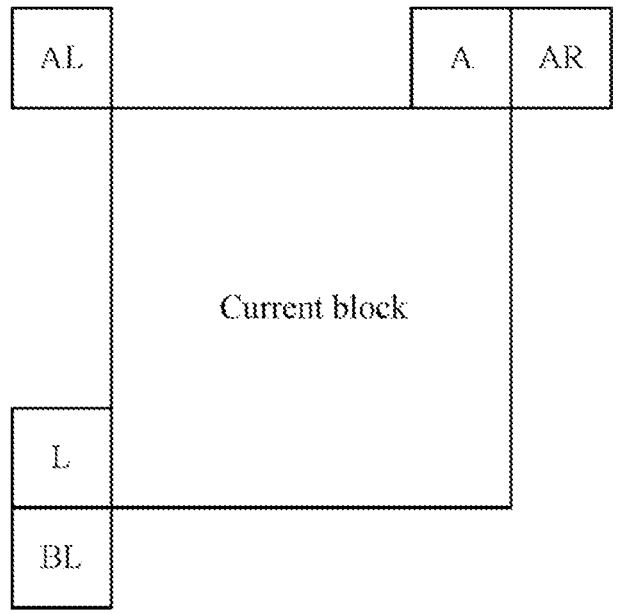
FIG. 5 is a schematic diagram of exemplary neighbouring intra prediction modes in accordance with an implementation of the present disclosure.

For example, in the luma intra prediction, as shown in FIG. 5, the reference blocks are determined from all neighbouring blocks above the current block and all neighbouring blocks on the left of the current block, for example, neighbouring blocks L (left), A (above), BL (bottom left), AR (above right) and AL (above left) of the current block are used as reference blocks in a set of reference blocks. In a derivation process of the MPM list, the intra prediction modes (also called intra prediction directions) of five neighbouring blocks of the current block, i.e., block L (left), block A (above), block BL (bottom left), block AR (above right) and block AL (above left) are considered.

Candidate prediction directions of the MPM list are divided into three groups: neighbouring prediction modes, derived prediction modes and default prediction modes. First, the neighbouring prediction modes are added to the MPM list. Each intra prediction mode can only be added to the MPM list once, that is, the MPM list cannot contain repeated prediction modes. If the number of the prediction modes contained in the MPM list after the adding of the neighbouring prediction modes is completed is less than 6, the derived intra prediction modes are added to the MPM list. If the number of the prediction modes contained in the MPM list after the adding of the neighbouring prediction modes is completed is still less than 6, the default intra prediction modes are added to the MPM list until the MPM list containing six most possible intra prediction modes is derived.

When entropy coding is performed for the intra prediction modes of each luma block, the MPM list of the luma block is obtained firstly, and it is determined whether a selected intra prediction mode of the luma block is in the MPM list. If the selected intra prediction mode of the luma block is in the MPM list, a truncated binary code is used to binarize an index number of the prediction mode in the MPM list. The smaller the index number is, the smaller the resulting truncated binary code is. Then the truncated binary code is encoded by an arithmetic encoder, thus bit overhead can be saved. If the selected intra prediction mode of the luma block is one of the remaining 61 prediction modes that are not in the MPM list, the 61 prediction modes are re-numbered from 0, and 16 prediction modes whose numbers can be exactly divisible by 4 are used as the selected modes. If the intra prediction mode is in the selected modes, bypass coding for it is performed using a fixed 4-bit length. If the intra prediction mode is in the remaining 45 non-selected modes, it is re-numbered and binarized using the truncated binary code, to generate a bit string with a length of 5 or 6 bits according to the number size, and then the bypass coding for it is performed.

Because a 6MPM list in JEM is complicated, a scheme using a simplified 3MPM list is proposed later. However, since the 3MPM list contains fewer prediction modes, and the resulting prediction effects are not accurate enough, a scheme using a simplified 6MPM list (which is also a method used in VTM3.0 at present) is proposed. For example, new candidate prediction modes of the current block are constructed based on prediction modes corresponding to block A (upper) and prediction modes corresponding to block L (left) in FIG. 5, and the MPM list is constructed as follows:

A reference line index used by the current block is 0.
When the prediction modes dirL and dirA of block L and block A are equal and neither of them is an angular mode, then MPM={dirL, Planar/DC, HOR $18^{th}$, VER $50^{th}$, VER-4, VER+4}; Planar corresponds to 0, DC corresponds to 1, and there must be 6 modes in the MPM list. A neighbouring mode is plus or minus 1.

When the prediction modes of block L and block A are equal and both of them are angular modes, then MPM={dirL,Planar/DC,dirL-1,dirL+1, dirL-2,dirL+2};

When the prediction modes of block L and block A are unequal and both of them are angular modes, then MPM={dirL,dirA,Planar/DC,max(dirL,dirA)-1,max (dirL,dirA)+1,max(dirL,dirA)-2};

When the prediction modes of block L and block A are unequal and only one of them is an angular mode, then MPM={dirL,dirA,Planar/DC,dirL-1,dirL+1,dirL-2};

When the prediction modes of block L and block A are unequal, and neither of them is an angular mode, then MPM={dirL,dirA,HOR,VER,HOR-4,HOR+4};

When the reference line index is 1 or 3:
When neither of the prediction modes dirL and dirA of block L and block A is an angular mode, then

MPM={VER,HOR,2,DIA,VDIA,26};

When the prediction modes dirL and dirA of block L and block A are both angular modes, then MPM={dirL,dirA,min(dirL,dirA)-1,min(dirL,dirA)+ 1,max(dirL,dirA)-1,max(dirL,dirA)+1, . . . };

When only one of the prediction modes dirL and dirA of block L and block A is an angular mode (represented by dir), then MPM={dir,dir-1,dir+1,dir-1,dir+2,dir-3}.

In the implementation of the present disclosure, related description of a method for constructing chroma intra prediction directions of DM and VVC draft 3 in the chroma intra prediction is as follows, as shown in Table 5:

TABLE 5

Figure 6:
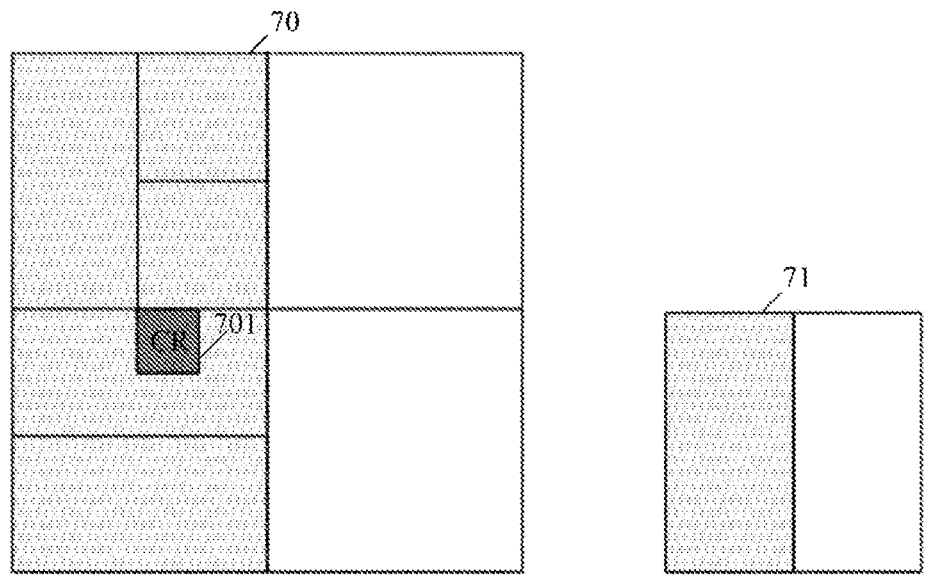
FIG. 6 is a schematic diagram of a first arrangement of exemplary luma blocks and chroma blocks corresponding to the current block in accordance with an implementation of the present disclosure.

| Serial number | Name | Description |
| --- | --- | --- |
| 1 | DM | See the prediction directions of the corresponding luma center block CR in FIG. 6 |
| 2 | CCLM CCLM_L CCLM_T | A prediction signal is constructed using a scheme of a* luma value +b CCLM calculates a and b according to the previous row and the left column CCLM_L calculates a and b using the left column CCLM_T calculate a and b using the previous row |
| 3 | DC | Prediction direction index number 1 in FIG. 1, if DM is DC mode, the line is changed to 66 |
| 4 | PLANAR | Prediction direction index number 0 in FIG. 1, if DM is PLANAR mode, the line is changed to 66 |
| 5 | VER | Prediction direction index number 50 in FIG. 1, if DM is VER mode, the line is changed to 66 |
| 6 | HOR | Prediction direction index number 18 in FIG. 1, if DM is HOR mode, the line is changed to 66 |

Illustratively, as shown in FIG. 6, there is provided a schematic diagram of arrangement of luma blocks and chroma blocks corresponding to the current block in accordance with the implementation of the present disclosure. As shown in FIG. 6, a gray area in the left half of a square on the right is the current processing chroma block 71, and a gray area in the left half of a square on the left is a luma area corresponding to the current processing chroma block 71. When intra prediction for the current chroma block 71 is performed, a prediction direction recorded at the center position of the luma area, i.e., a prediction direction of a CR luma block 701 in the square on the right in FIG. 6, is used.

It can be determined, in conjunction with the contents shown in table 5 and FIG. 6, that if a prediction direction obtained by DM is the same as one of the last four prediction directions, the same mode of lines 3-6 will be replaced by a prediction direction with index number 66.

MDMS for chroma intra prediction is a more complex method of constructing chroma intra prediction directions. As shown in table 6, compared with DM, there is a code rate saving of 0.2%, but it has not been applied to VVC because of excessive complexity.

TABLE 6

| Serial number | Name | Description |
|---|---|---|
| 1 | CCLM | A prediction signal is constructed using a scheme of a* luma value +b |
| Five prediction directions are selected sequentially | DM | Intra prediction directions of corresponding luma blocks, i.e., blocks 801 to 805 in FIG. 8(a), at the center, top-left, top-right, bottom-left and bottom-right positions of the current chroma block are borrowed |
| | Chroma neighbouring block | Intra prediction directions of the left, top-left, bottom-left, upper and top-right blocks, i.e., blocks 806 to 810 in FIG. 8(b), neighbouring spatially to the chroma block |
| | DC | Prediction direction index number 1 in FIG. 1B |
| | PLANAR | Prediction direction index number 0 in FIG. 1B |
| | Fine adjustment of existing prediction direction | A prediction direction derived from the previous existing prediction direction plus or MINUS 1 |
| | Default mode: | VER (18), HOR (50), 2, 34, 66, 10, 26 |

Figure 7:
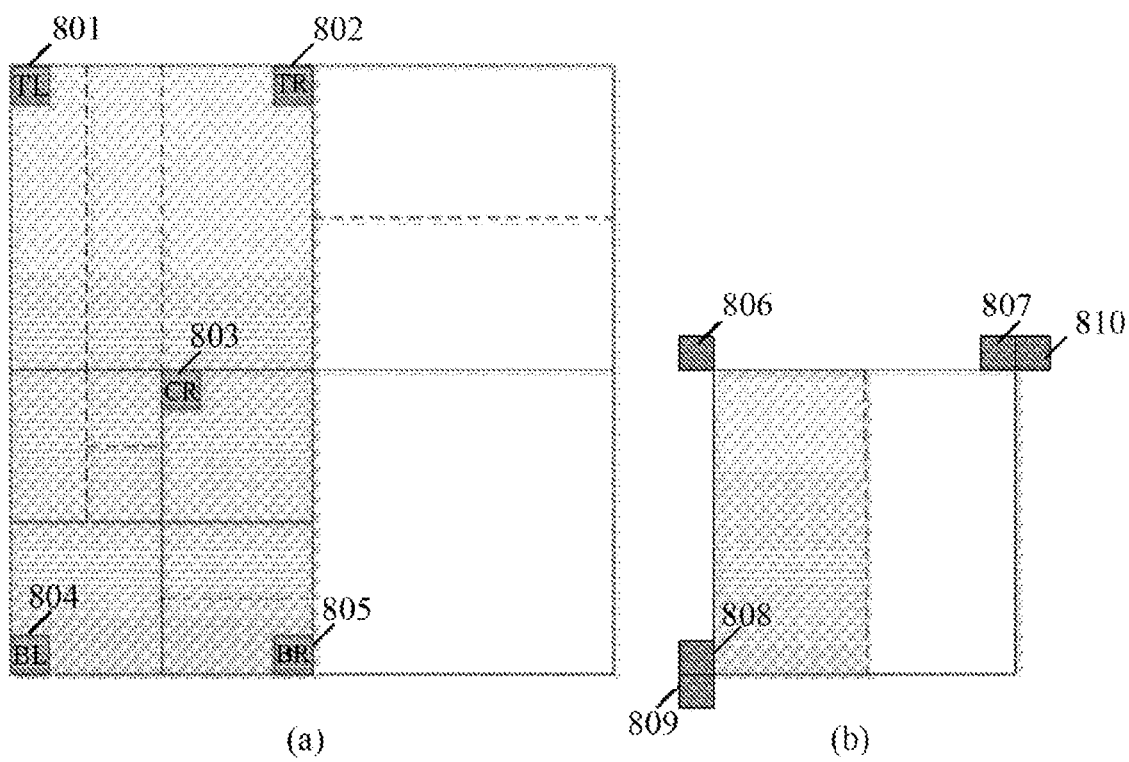
FIG. 7 is a schematic diagram of a second arrangement of exemplary luma blocks and chroma blocks corresponding to the current block in accordance with an implementation of the present disclosure.

As shown in FIG. 7, as shown in blocks 801 to 805 on the left in FIG. 7, MDMS modes in table 6 are the intra prediction modes of the corresponding luma blocks at five positions, i.e., the center (CR), top-left (TL), top-right (TR), bottom-left (BL) and bottom-right (BR) positions of the current chroma block used, as shown in blocks 806 to 810 on the right in FIG. 7, and chroma neighbouring block modes in table 6 are the intra prediction modes of left, top-left, bottom-left, upper and top-right blocks neighbouring spatially to the chroma block used.

That is to say, in the implementation of the present disclosure, the intra prediction device can perform both luma intra prediction and chroma intra prediction.

It can be understood that it is proposed in the present disclosure that the angular modes of all rectangular blocks represent the actual angular modes corresponding to the starting angles plus the angle offset ranges in turn using the relative angle numbers, and are unified an internal within [a starting value angle+a lower limit value of an angle offset range, a starting value angle+an upper limit value of the angle offset range]. In the representation method of the implementation of the present disclosure, different starting angles are set according to different reference block width-height relationships, old angular mode numbers are used as the meaning representing new angular modes, and the angular modes correspond to the angles one to one, thus the angular mode numbers of the rectangular blocks with various width-height relationships are unified, and the angle directions represented in the luma MPM list and chroma prediction DM are consistent with the actual angles, thereby simplifying angle conversion in the wide angular modes, unifying an angle value meaning represented by each mode, and eliminating deviation, which is conducive to improvement of the accuracy of intra prediction.

Further, the relative angle numbers are transmitted as the syntax elements of the angular mode numbers in the bitstream, thus the acquisition of the real prediction angles by a codec in the wide angular modes is simplified, which is conducive to improvement of the efficiency of encoding and decoding.

Based on the implementation of the foregoing implementations, an implementation of the present disclosure provides an intra prediction device including:

a configuration part configured to configure actual angular modes represented by relative angle numbers; wherein the relative angle numbers successively represents the corresponding actual angular modes after sampling is performed at preset angle sampling points starting from starting angles within prediction direction ranges corresponding to preset width-height relationships; and the starting angles are determined according to the width-height relationships of processed blocks and the prediction direction ranges corresponding to the preset width-height relationships, and actual angles correspond to the actual angular modes one to one.

In some implementations of the present disclosure, when the sampling is performed at 65 preset angle sampling points, the relative angle numbers are consecutive numbers in a range from 2' to 66', the actual angular modes corresponding to the relative angle numbers are 65 consecutive actual angular modes in a range from −14 to 80, and selection of the 65 actual angular modes is determined by the width-height relationships, wherein the relative angle numbers correspond to the actual angular modes one to one in sequence.

In some implementations of the present disclosure, when the sampling is performed at 33 preset angle sampling points, the relative angle numbers are consecutive numbers in a range from 2' to 34', the actual angular modes corresponding to the relative angle numbers are 33 consecutive actual angular modes in a range from −7 to 41, and selection of the 33 actual angular modes is determined by the width-height relationships, wherein the relative angle numbers corresponding to the actual angular modes one to one in sequence.

In some implementations of the present disclosure, when the sampling is performed at 129 preset angle sampling points, the relative angle numbers are consecutive numbers in a range from 2' to 130', the actual angular modes corresponding to the relative angle numbers are 129 consecutive actual angular modes in a range from −28 to 158, and selection of the 129 actual angular modes is determined by the width-height relationships, wherein the relative angle numbers correspond to the actual angular modes one to one in sequence.

Figure 8:
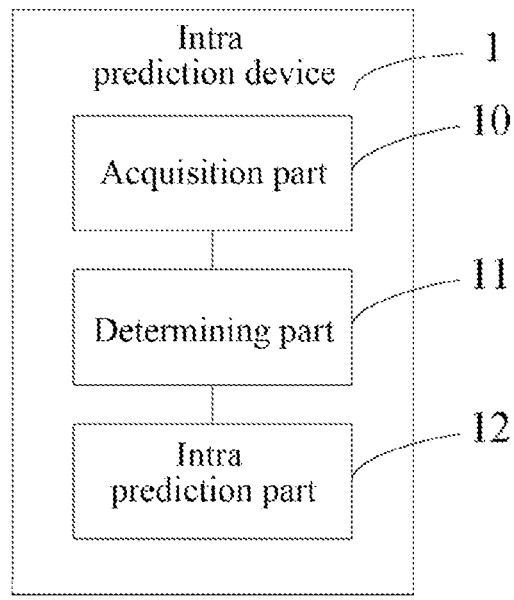
FIG. 8 is a schematic diagram of a first structure of an intra prediction device in accordance with an implementation of the present disclosure.

On the basis of the implementation of the foregoing implementations, as shown in FIG. 8, an implementation of the present disclosure further provides an intra prediction device 1 including:

an acquisition part 10 configured to acquire width-height relationships of reference blocks of a current block, prediction direction ranges corresponding to preset width-height relationships and preset angle sampling points; and a determining part 11 configured to determine actual angular modes corresponding to the reference blocks represented by relative angle numbers according to the width-height relationships, the prediction direction ranges corresponding to the preset width-height relationships and the preset angle sampling points, to cause actual angles to correspond to the actual angular modes one to one.

The acquisition part 10 is further configured to obtain angular prediction modes corresponding to the reference blocks based on the actual angular modes corresponding to the reference blocks.

The intra prediction device 1 includes an intra prediction part 12 configured to perform intra prediction for the current block based on the angular prediction modes.

In some implementations of the present disclosure, the determining part 11 is specifically configured to determine the starting angles of the angular modes of the reference blocks according to the width-height relationships and the prediction direction ranges corresponding to the preset width-height relationships, and determine angle offset ranges of the reference blocks based on the preset angle sampling points; and determine the actual angular modes corresponding to the reference blocks represented by the relative angle numbers according to the starting angles and the angle offset ranges.

In some implementations of the present disclosure, the intra prediction part 12 is specifically configured to construct a prediction mode list of the current block based on the angular prediction modes; and implement the intra prediction for the current block using the prediction mode list.

In some implementations of the present disclosure, the intra prediction includes at least one of luma intra prediction and chroma intra prediction.

Figure 9:
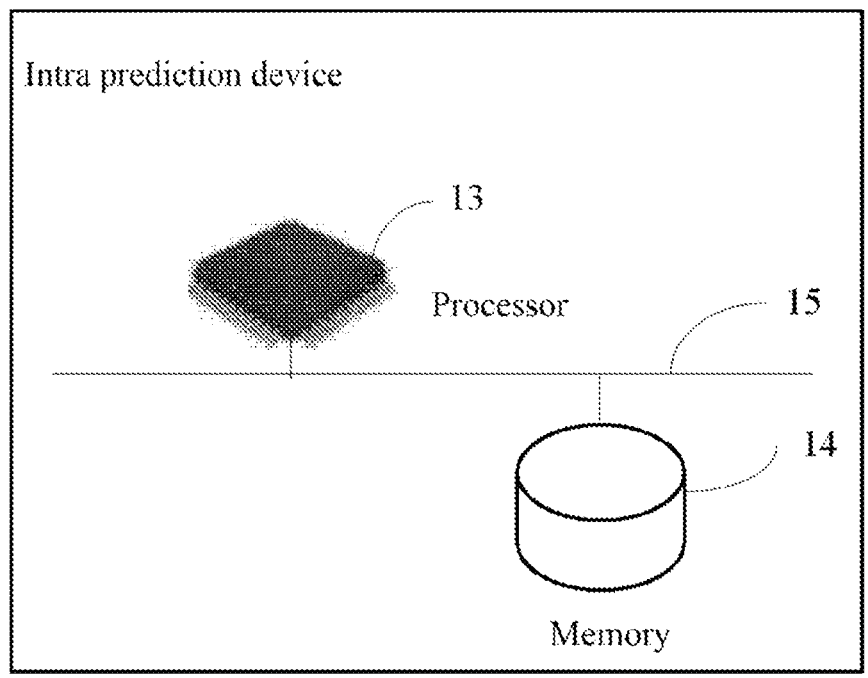
FIG. 9 is a schematic diagram of a second structure of an intra prediction device in accordance with an implementation of the present disclosure.

As shown in FIG. 9, an implementation of the present disclosure further provides an intra prediction device including:

a processor 13, a memory 14 having stored therein intra prediction instructions executable by the processor 13, and a communication bus 15 for connecting the processor 13 and the memory 14, wherein the intra prediction instructions, when executed, implement the intra prediction methods described above.

In the implementations of the present disclosure, the processor 13 described above may be at least one of an application specific integrated circuit (ASIC), a digital signal processor (DSP), a digital signal processing device (DSPD), a programmable logic device (PLD), a field programmable gate array (FPGA), a central processing unit (CPU), a controller, a microcontroller and a microprocessor. It can be understood that for different devices, electronic devices for implementing the above processor functions may also be other devices, which are not limited specifically in the implementations of the present disclosure. The intra prediction device may further include a memory 14, which may be connected to the processor 13, wherein the memory 14 is used for storing executable program codes including computer operation instructions. The memory 14 may be a volatile memory, such as a random-access memory (RAM); or a non-volatile memory, such as a read-only memory (ROM), a flash memory, a hard disk drive (HDD) or a solid-state drive (SSD); or a combination of the above types of memories, and provides instructions and data to the processor 13.

In the implementations of the present disclosure, the communication bus 15 is used for connecting the processor 13 and the memory 14 and intercommunication between these devices.

In addition, various functional modules in the implementations may be integrated into one processing unit, or various units may be physically presented separately, or two or more than two units may be integrated into one unit. The integrated units may be implemented in a form of hardware, or may be implemented in a form of a software functional module.

The integrated units, if implemented in a form of a software functional module and not sold or used as an independent product, may be stored in a computer-readable storage medium. Based on such understanding, the technical scheme of the implementations, in essence, or the part contributing to the prior art, or all or part of the technical scheme, may be embodied in a form of a software product, which is stored in a storage medium, and includes several instructions for causing a computer device (which may be a personal computer, a server, or a network device, etc.) or a processor to perform all or part of steps of the methods in accordance with the implementations. The aforementioned storage medium includes various media, such as a U disk, a mobile hard disk, a read-only memory, a random access memory, a magnetic disk, or an optical disk, which are capable of storing program codes.

An implementation of the present disclosure provides a computer-readable storage medium having intra prediction instructions stored therein, wherein the intra prediction instructions, when executed by a processor, implement the intra prediction methods described above.

Specifically, the intra prediction instructions corresponding to the intra prediction method in the implementation can be stored on a storage medium such as a CD, a hard disk, a U disk, etc. When the intra prediction instructions corresponding to the intra prediction method in the storage medium is read or executed by an electronic device, the intra prediction method includes the following steps: acquiring width-height relationships of reference blocks of a current block, prediction direction ranges corresponding to preset width-height relationships and preset angle sampling points; determining actual angular modes corresponding to the reference blocks represented by relative angle numbers according to the width-height relationships, the prediction direction ranges corresponding to the preset width-height relationships and the preset angle sampling points, to cause actual angles to correspond to the actual angular modes one to one; obtaining angular prediction modes corresponding to the reference blocks based on the actual angular modes corresponding to the reference blocks; and performing intra prediction for the current block based on the angular prediction modes.

It can be understood that the intra prediction device can use a unified approach for the actual angular modes to process the reference blocks with different width-height relationships in the intra prediction process, to cause the actual angles to correspond to the actual angular modes one to one, such that when a certain angle is represented, the angular modes of blocks of each shape can be specifically determined according to length to width ratios whether in a luma prediction process or in a chroma prediction process, to simplify angle conversion in wide angular modes, unify an angle value meaning represented by each mode, and eliminate a deviation, thereby improving the accuracy of the intra prediction effectively while improving the efficiency of coding and decoding.

It should be understood by a person skilled in the art that the implementations of the present disclosure may be provided as methods, systems, or computer program products. Therefore, the present disclosure may use the form of a hardware implementation, a software implementation, or an implementation combining software and hardware. Moreover, the present disclosure may use the form of a computer program product implemented on one or more computer usable storage media (including, but not limited to, a magnetic disk memory, an optical memory, etc.) containing computer usable program codes.

The present disclosure is described with reference to implementation flowcharts and/or block diagrams of the methods, devices (systems), and computer program products in accordance with the implementations of the present disclosure. It should be understood that each flow and/or block in the flowcharts and/or the block diagrams, and combinations of flows and/or blocks in the flowcharts and/or the block diagrams may be implemented by computer program instructions. These computer program instructions may be provided to a processor of a general purpose computer, a special purpose computer, an embedded processing machine or other programmable data processing devices to generate a machine, such that instructions which are executed by a processor of a computer or another programmable data processing devices generate an apparatus for implementing functions specified in one or more flows in the implementation flowcharts and/or one or more blocks in the block diagrams.

These computer program instructions may also be stored in a computer-readable memory that can instruct a computer or other programmable data processing devices to operate in a particular manner, such that the instructions stored in the computer-readable memory generate an article of manufacture including an instruction apparatus, wherein the instruction apparatus implements functions specified in one or more flows in the implementation flowcharts and/or one or more blocks in the block diagrams.

These computer program instructions may also be loaded onto a computer or other programmable data processing devices to cause a series of operational steps to be performed on a computer or other programmable devices to generate computer-implemented processing, such that the instructions executed on the computer or the other programmable device provide stepts for implementing functions specified in one or more flows in the implementation flowcharts and/or one or more blocks in the block diagrams.

What are described above are merely preferred implementations of the present disclosure and are not intended to limit the protection scope of the present disclosure.

INDUSTRIAL APPLICABILITY

The implementations of the present disclosure provide an intra prediction method and device, and a computer-readable storage medium. The intra prediction device can use a unified approach for the actual angular modes to process the reference blocks with different width-height relationships in the intra prediction process, to cause the actual angles to correspond to the actual angular modes one to one, such that when a certain angle is represented, the angular modes of blocks of each shape can be specifically determined according to length to width ratios whether in a luma prediction process or in a chroma prediction process, to simplify angle conversion in wide angular modes, unify an angle value meaning represented by each mode, and eliminate a deviation, thereby improving the accuracy of the intra prediction effectively while improving the efficiency of coding and decoding.

What we claim is:

1. A method for intra prediction, applied to a decoder, the method comprising:
   determining multiple neighbouring blocks of a current block;
   determining first intra prediction modes of the multiple neighbouring blocks;
   determining a maximum value and a minimum value of the first intra prediction modes of the multiple neighbouring blocks;
   taking the first intra prediction modes of the multiple neighbouring blocks and at least one of the maximum value or the minimum value of the first intra prediction modes of the multiple neighbouring blocks as relative angular prediction modes to calculate at least one real angular prediction mode;
   constructing an intra prediction mode list corresponding to the current block based on one or more of: the first intra prediction modes of the multiple neighbouring blocks, the at least one of the maximum value or the minimum value of the first intra prediction modes of the multiple neighbouring blocks, and/or the at least one real angular prediction mode, in a case that the first intra prediction modes are angular intra prediction modes;
   determining a first intra prediction mode number of the current block based on the intra prediction mode list;
   obtaining a width-height ratio of the current block, and mapping, according to the width-height ratio of the current block, the first intra prediction mode number of the current block to a second intra prediction mode number in a wide-angle intra prediction mode;
   performing prediction for the current block based on a target intra prediction mode corresponding to the second intra prediction mode number of the current block, and obtaining a prediction block.

2. The method according to claim 1, wherein the method further comprises:
   obtaining reconstructed blocks of the multiple neighbouring blocks, wherein the reconstructed blocks are obtained by prediction based on intra prediction modes corresponding to second intra prediction mode numbers of the multiple neighbouring blocks, and the second intra prediction mode numbers of the multiple neighbouring blocks are obtained by mapping, based on width-height ratios of the multiple neighbouring blocks, first intra prediction mode numbers of the multiple neighbouring blocks to intra prediction mode numbers of the wide-angle intra prediction mode; and
   obtaining the prediction block based on the target intra prediction mode corresponding to the second intra prediction mode number of the current block and the reconstructed blocks of the multiple neighbouring blocks.

3. The method according to claim 1, wherein the multiple neighbouring blocks of the current block comprise at least one of a left neighbouring block or an above neighbouring block of the current block.

4. The method according to claim 1, wherein the method further comprises:
   obtaining the at least one real angular prediction mode based on a preset offset value and the relative angular prediction modes, wherein the preset offset value is 1 or 2.

5. The method according to claim 1, wherein the method further comprises:
calculating a sum or difference of the preset offset value and the relative angular prediction modes, and
determining the at least one real angular prediction mode based on the sum or difference.

6. The method according to claim 1, wherein the step of obtaining a width-height ratio of the current block, and mapping, according to the width-height ratio, the first intra prediction mode number to a second intra prediction mode number in a wide-angle intra prediction mode comprises:
determining the second intra prediction mode number based on a first preset value and the first intra prediction mode number, in case that width of the current block is bigger than height of the current block and a width to height ratio is bigger than or equal to 2;
determining the second intra prediction mode number based on a second preset value and the first intra prediction mode number, in case that height of the current block is bigger than width of the current block and a height to width ratio is bigger than or equal to 2.

7. The method according to claim 1, wherein in case that the width of the current block is equal to the height of the current block, skip the step of mapping, according to the width-height ratio, the first intra prediction mode number to the second intra prediction mode number in the wide-angle intra prediction mode.

8. The method according to claim 6, wherein in case that the width of the current block is bigger than the height of the current block and the width to height ratio is bigger than or equal to 2:
when the width to height ratio is 2 and the first intra prediction mode number is less than 8, determining the second intra prediction mode number based on a sum of the first intra prediction mode number and the first preset value 65;
when the width to height ratio is 4 and the first intra prediction mode number is less than 12, determining the second intra prediction mode number based on the sum of the first intra prediction mode number and the first preset value 65;
when the width to height ratio is 8 and the first intra prediction mode number is less than 14, determining the second intra prediction mode number based on the sum of the first intra prediction mode number and the first preset value 65;
when the width to height ratio is 16 and the first intra prediction mode number is less than 16, determining the second intra prediction mode number based on the sum of the first intra prediction mode number and the first preset value 65;
wherein a range of the second intra prediction mode number is 8 to 80.

9. The method according to claim 6, wherein in case that the height of the current block is bigger than the width of the current block and the height to width ratio is bigger than or equal to 2:
when the height to width ratio is 2 and the first intra prediction mode number is bigger than 60, determining the second intra prediction mode number based on a difference between the first intra prediction mode number and the second preset value 67;
when the height to width ratio is 4 and the first intra prediction mode number is bigger than 58, determining the second intra prediction mode number based on the difference between the first intra prediction mode number and the second preset value 67;
when the height to width ratio is 8 and the first intra prediction mode number is bigger than 56, determining the second intra prediction mode number based on the difference between the first intra prediction mode number and the second preset value 67;
when the height to width ratio is 16 and the first intra prediction mode number is bigger than 54, determining the second intra prediction mode number based on the difference between the first intra prediction mode number and the second preset value 67;
wherein a range of the second intra prediction mode number is −14 to 60.

10. The method according to claim 1, wherein
in case that the width of the current block is bigger than the height of the current block and width to height ratio is bigger than or equal to 2, determining the second intra prediction mode number based on the following table:

| the width to height ratio | first intra prediction mode numbers | second intra prediction mode numbers |
| --- | --- | --- |
| W/H == 2 | 2, 3, 4, 5, 6, 7 | 67, 68, 69, 70, 71,72 |
| W/H == 4 | 2 to 11 | 67 to 76 |
| W/H == 8 | 2 to 13 | 67 to 78 |
| W/H == 16 | 2 to 15 | 67 to 80 | in case that the height of the current block is bigger than the width of the current block and height to width ratio is bigger than or equal to 2, determining the second intra prediction mode number based on the following table:

| the height to width ratio | the first intra prediction mode numbers | the second intra prediction mode numbers |
| --- | --- | --- |
| H/W == 2 | 61, 62, 63, 64, 65, 66 | −6, −5, −4, −3, −2, −1 |
| H/W == 4 | 57 to 66 | −10 to −1 |
| H/W == 8 | 55 to 66 | −12 to −1 |
| H/W == 16 | 53 to 66 | −14 to −1 | wherein, in both tables, the first intra prediction mode numbers are sequentially mapped to the second intra prediction mode numbers one to one.

11. A method for intra prediction, applied to an encoder, the method comprising:
determining multiple neighbouring blocks of a current block;
determining first intra prediction modes of the multiple neighbouring blocks;
determining a maximum value and a minimum value of the first intra prediction modes of the multiple neighbouring blocks;
taking the first intra prediction modes of the multiple neighbouring blocks and at least one of the maximum value or the minimum value of the first intra prediction modes of the multiple neighbouring blocks as relative angular prediction modes to calculate at least one real angular prediction mode;
constructing an intra prediction mode list corresponding to the current block based on one or more of: the first intra prediction modes of the multiple neighbouring blocks, the at least one of the maximum value or the minimum value of the first intra prediction modes of the multiple neighbouring blocks, and/or the at least one real angular prediction mode, in a case that the first intra prediction modes are angular intra prediction modes;

determining a first intra prediction mode number of the current block based on the intra prediction mode list;

obtaining a width-height ratio of the current block, and mapping, according to the width-height ratio of the current block, the first intra prediction mode number of the current block to a second intra prediction mode number in a wide-angle intra prediction mode;

performing prediction for the current block based on a target intra prediction mode corresponding to the second intra prediction mode number of the current block, and obtaining a prediction block.

12. The method according to claim 11, wherein the method further comprises:

obtaining reconstructed blocks of the multiple neighbouring blocks, wherein the reconstructed blocks are obtained by prediction based on intra prediction modes corresponding to second intra prediction mode numbers of the multiple neighbouring blocks, and the second intra prediction mode numbers of the multiple neighbouring blocks are obtained by mapping, based on width-height ratios of the multiple neighbouring blocks, first intra prediction mode numbers of the multiple neighbouring blocks to intra prediction mode numbers of the wide-angle intra prediction mode; and obtaining the prediction block based on the target intra prediction mode corresponding to the second intra prediction mode number of the current block and the reconstructed blocks of the multiple neighbouring blocks.

13. The method according to claim 11, wherein the multiple neighbouring blocks of the current block comprise at least one of a left neighbouring block or an above neighbouring block of the current block.

14. The method according to claim 11, wherein the method further comprises:

obtaining the at least one real angular prediction mode based on a preset offset value and the relative angular prediction modes, wherein the preset offset value is 1 or 2.

15. The method according to claim 11, wherein the method further comprises:

calculating a sum or difference of the preset offset value and the relative angular prediction modes, and determining the at least one real angular prediction mode based on the sum or difference.

16. The method according to claim 11, wherein the step of obtaining a width-height ratio of the current block, and mapping, according to the width-height ratio, the first intra prediction mode number to a second intra prediction mode number in a wide-angle intra prediction mode comprises:

determining the second intra prediction mode number based on a first preset value and the first intra prediction mode number, in case that width of the current block is bigger than height of the current block and a width to height ratio is bigger than or equal to 2;

determining the second intra prediction mode number based on a second preset value and the first intra prediction mode number, in case that height of the current block is bigger than width of the current block and a height to width ratio is bigger than or equal to 2.

17. The method according to claim 16, wherein in case that the width of the current block is bigger than the height of the current block and the width to height ratio is bigger than or equal to 2:

when the width to height ratio is 2 and the first intra prediction mode number is less than 8, determining the second intra prediction mode number based on a sum of the first intra prediction mode number and the first preset value 65;

when the width to height ratio is 4 and the first intra prediction mode number is less than 12, determining the second intra prediction mode number based on the sum of the first intra prediction mode number and the first preset value 65;

when the width to height ratio is 8 and the first intra prediction mode number is less than 14, determining the second intra prediction mode number based on the sum of the first intra prediction mode number and the first preset value 65;

when the width to height ratio is 16 and the first intra prediction mode number is less than 16, determining the second intra prediction mode number based on the sum of the first intra prediction mode number and the first preset value 65;

wherein a range of the second intra prediction mode number is 8 to 80;

wherein in case that the height of the current block is bigger than the width of the current block and the height to width ratio is bigger than or equal to 2:

when the height to width ratio is 2 and the first intra prediction mode number is bigger than 60, determining the second intra prediction mode number based on a difference between the first intra prediction mode number and the second preset value 67;

when the height to width ratio is 4 and the first intra prediction mode number is bigger than 58, determining the second intra prediction mode number based on the difference between the first intra prediction mode number and the second preset value 67;

when the height to width ratio is 8 and the first intra prediction mode number is bigger than 56, determining the second intra prediction mode number based on the difference between the first intra prediction mode number and the second preset value 67;

when the height to width ratio is 16 and the first intra prediction mode number is bigger than 54, determining the second intra prediction mode number based on the difference between the first intra prediction mode number and the second preset value 67;

wherein a range of the second intra prediction mode number is −14 to 60.

18. The method according to claim 11, wherein in case that the width of the current block is bigger than the height of the current block and width to height ratio is bigger than or equal to 2, determining the second intra prediction mode number based on the following table:

| the width to height ratio | first intra prediction mode numbers | second intra prediction mode numbers |
| --- | --- | --- |
| W/H = = 2 | 2, 3, 4, 5, 6, 7 | 67, 68, 69, 70, 71,72 |
| W/H = = 4 | 2 to 11 | 67 to 76 |
| W/H = = 8 | 2 to 13 | 67 to 78 |
| W/H = = 16 | 2 to 15 | 67 to 80 | in case that the height of the current block is bigger than the width of the current block and height to width ratio is bigger than or equal to 2, determining the second intra prediction mode number based on the following table:

| the height to width ratio | the first intra prediction mode numbers | the second intra prediction mode numbers |
| --- | --- | --- |
| H/W == 2 | 61, 62, 63, 64, 65, 66 | −6, −5, −4, −3, −2, −1 |
| H/W == 4 | 57 to 66 | −10 to −1 |
| H/W == 8 | 55 to 66 | −12 to −1 |
| H/W == 16 | 53 to 66 | −14 to −1 | wherein, in both tables, the first intra prediction mode numbers are sequentially mapped to the second intra prediction mode numbers one to one.

19. A decoder, comprising: a processor, a memory having stored therein intra prediction instructions executable by the processor, and a communication bus for connecting the processor and the memory, wherein the intra prediction instructions, when executed, cause the processor to:
determine multiple neighbouring blocks of a current block;
determine first intra prediction modes of the multiple neighbouring blocks;
determine a maximum value and a minimum value of the first intra prediction modes of the multiple neighbouring blocks;
take the first intra prediction modes of the multiple neighbouring blocks and at least one of the maximum value or the minimum value of the first intra prediction modes of the multiple neighbouring blocks as relative angular prediction modes to calculate at least one real angular prediction mode;
construct an intra prediction mode list corresponding to the current block based on one or more of: the first intra prediction modes of the multiple neighbouring blocks, the at least one of the maximum value or the minimum value of the first intra prediction modes of the multiple neighbouring blocks, and/or the at least one real angular prediction mode, in a case that the first intra prediction modes are angular intra prediction modes;
determine a first intra prediction mode number of the current block based on the intra prediction mode list;
obtain a width-height ratio of the current block, and map, according to the width-height ratio of the current block, the first intra prediction mode number of the current block to a second intra prediction mode number in a wide-angle intra prediction mode;
perform prediction for the current block based on a target intra prediction mode corresponding to the second intra prediction mode number of the current block, and obtain a prediction block.

20. The decoder according to claim 19, wherein when the intra prediction instructions are executed, the processor is caused to:
obtain reconstructed blocks of the multiple neighbouring blocks, wherein the reconstructed blocks are obtained by prediction based on intra prediction modes corresponding to second intra prediction mode numbers of the multiple neighbouring blocks, and the second intra prediction mode numbers of the multiple neighbouring blocks are obtained by mapping, based on width-height ratios of the multiple neighbouring blocks, first intra prediction mode numbers of the multiple neighbouring blocks to intra prediction mode numbers of the wide-angle intra prediction mode; and
obtain the prediction block based on the target intra prediction mode corresponding to the second intra prediction mode number of the current block and the reconstructed blocks of the multiple neighbouring blocks.

21. The decoder according to claim 19, wherein the multiple neighbouring blocks of the current block comprise at least one of a left neighbouring block or an above neighbouring block of the current block.

22. The decoder according to claim 19, wherein when the intra prediction instructions are executed, the processor is caused to:
obtain the at least one real angular prediction mode based on a preset offset value and the relative angular prediction modes, wherein the preset offset value is 1 or 2.

23. The decoder according to claim 19, wherein when the intra prediction instructions are executed, the processor is caused to:
calculate a sum or difference of the preset offset value and the relative angular prediction modes, and
determine the at least one real angular prediction mode based on the sum or difference.

24. An encoder, comprising: a processor, a memory having stored therein intra prediction instructions executable by the processor, and a communication bus for connecting the processor and the memory, wherein the intra prediction instructions, when executed, cause the processor to:
determine multiple neighbouring blocks of a current block;
determine first intra prediction modes of the multiple neighbouring blocks;
determine a maximum value and a minimum value of the first intra prediction modes of the multiple neighbouring blocks;
take the first intra prediction modes of the multiple neighbouring blocks and at least one of the maximum value or the minimum value of the first intra prediction modes of the multiple neighbouring blocks as relative angular prediction modes to calculate at least one real angular prediction mode;
construct an intra prediction mode list corresponding to the current block based on one or more of: the first intra prediction modes of the multiple neighbouring blocks, the at least one of the maximum value or the minimum value of the first intra prediction modes of the multiple neighbouring blocks, and/or the at least one real angular prediction mode, in a case that the first intra prediction modes are angular intra prediction modes;
determine a first intra prediction mode number of the current block based on the intra prediction mode list;
obtain a width-height ratio of the current block, and mapping, according to the width-height ratio of the current block, the first intra prediction mode number of the current block to a second intra prediction mode number in a wide-angle intra prediction mode;
perform prediction for the current block based on a target intra prediction mode corresponding to the second intra prediction mode number of the current block, and obtain a prediction block.

* * * * *